United States Patent [19]
Rupert

[11] Patent Number: 6,152,474
[45] Date of Patent: Nov. 28, 2000

[54] ADJUSTABLE MOTORCYCLE FOOT REST

[76] Inventor: Gary A. Rupert, R.R. 1 Box 183, Shelocta, Pa. 15774-9512

[21] Appl. No.: 09/022,363

[22] Filed: Feb. 12, 1998

[51] Int. Cl.[7] .................................................. B62J 25/00
[52] U.S. Cl. ............................. 280/291; 280/289; 296/75
[58] Field of Search .................................... 280/291, 301, 280/293, 166, 289; 248/291.1; 180/219; 296/75

[56] References Cited

U.S. PATENT DOCUMENTS

| | | | |
|---|---|---|---|
| 516,902 | 3/1894 | Smith | 280/291 |
| 3,313,386 | 4/1967 | Schwalm | 193/22 |
| 4,174,852 | 11/1979 | Panzica et al. | 280/291 |
| 4,546,993 | 10/1985 | Walker | 280/291 |
| 5,454,580 | 10/1995 | Lin | 280/291 |
| 5,482,307 | 1/1996 | Lin | 280/291 |
| 5,524,918 | 6/1996 | Peabody et al. | 280/291 |
| 5,779,254 | 7/1998 | James et al. | 280/291 |

*Primary Examiner*—Lanna Mai
*Assistant Examiner*—Hau Phan

[57] ABSTRACT

A motorcycle foot rest for mounting to a motorcycle of the type having a substantially U-shaped crash bar with upper and lower bar portions. The foot rest includes a mounting plate having a mounting bore for receiving the upper bar portion of the crash bar of the motorcycle. A foot rest member includes a first elongate member and a second elongate member, with the first elongate member having an upper end and a lower end. The second elongate member has an inner end connected to the lower end of the first elongate member such that the longitudinal axis of the second elongate member is oriented substantially perpendicular to the first elongate member. The upper end of the first elongate member is pivotally connected to the mounting plate for permitting pivoting of the first elongate member about a substantially horizontal axis and swinging the second elongate member about the substantially horizontal axis. A locking assembly is provided for releasably locking the first elongate member at a plurality of pivot positions about the substantially horizontal pivot axis such that the second elongate member is lockable at a plurality of swing positions relative to the mounting plate.

10 Claims, 2 Drawing Sheets

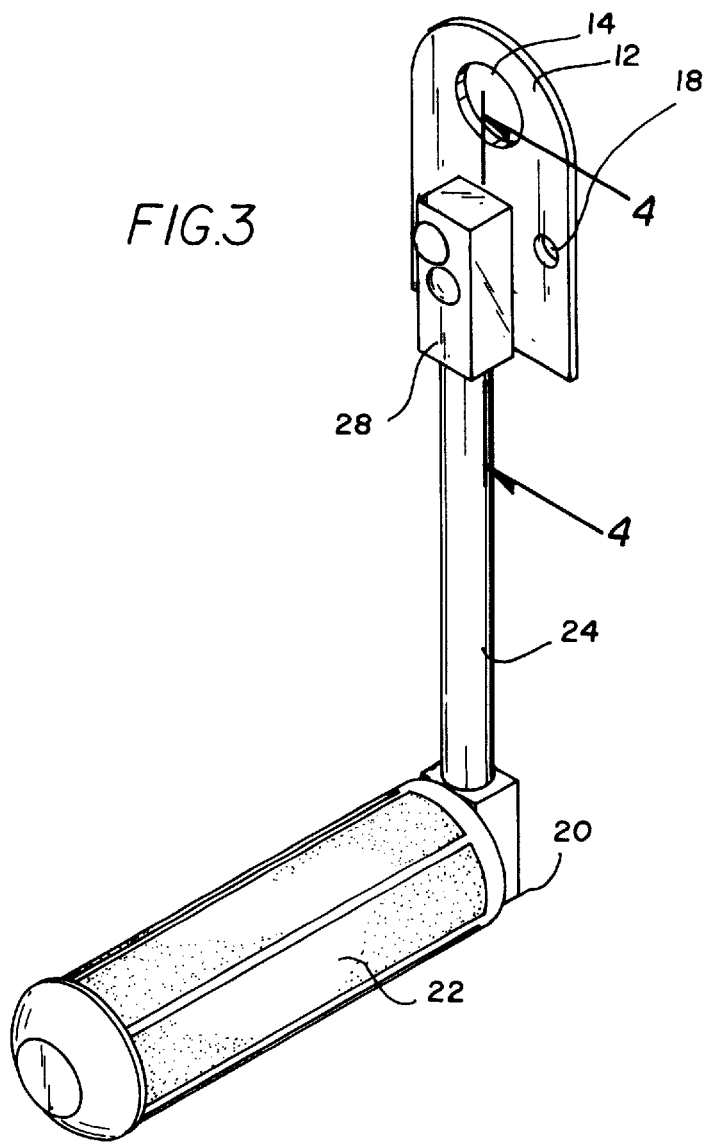
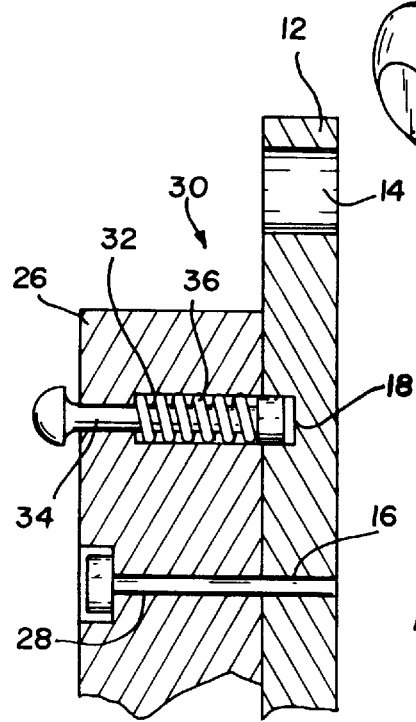
FIG.3
FIG.4

ADJUSTABLE MOTORCYCLE FOOT REST

BACKGROUND OF THE INVENTION

1. Field of the Invention

The present invention relates to motorcycle foot rests and more particularly pertains to a new adjustable motorcycle foot rest for providing an adjustable foot rest that is removably coupleable to a crash bar of a motorcycle.

2. Description of the Prior Art

The use of motorcycle foot rests is known in the prior art. More specifically, motorcycle foot rests heretofore devised and utilized are known to consist basically of familiar, expected and obvious structural configurations, notwithstanding the myriad of designs encompassed by the crowded prior art which have been developed for the fulfillment of countless objectives and requirements.

Known prior art motorcycle foot rests include U.S. Pat. Nos. 5,090,715; 4,546,993; 4,174,852; 1,261,442; 3,484,829; and Foreign Patents EP 0 360 245 A2 and EP 0 439 67 A1.

In these respects, the adjustable motorcycle foot rest according to the present invention substantially departs from the conventional concepts and designs of the prior art, and in so doing provides an apparatus primarily developed for the purpose of providing an adjustable foot rest that is removably coupleable to a crash bar of a motorcycle.

SUMMARY OF THE INVENTION

In view of the foregoing disadvantages inherent in the known types of motorcycle foot rests now present in the prior art, the present invention provides a new adjustable motorcycle foot rest construction wherein the same can be utilized for providing an adjustable foot rest that is removably coupleable to a crash bar of a motorcycle.

The general purpose of the present invention, which will be described subsequently in greater detail, is to provide a new adjustable motorcycle foot rest apparatus and method which has many of the advantages of the motorcycle foot rests mentioned heretofore and many novel features that result in a new adjustable motorcycle foot rest which is not anticipated, rendered obvious, suggested, or even implied by any of the prior art motorcycle foot rests, either alone or in any combination thereof.

To attain this, the present invention generally comprises a mounting plate having a front face, a rear face and a periphery. Such periphery is defined by a semi-circular top edge and a rectangular bottom edge. As shown in FIG. 3, the mounting plate has a circular mounting bore formed therein in concentric relationship with the top edge of the plate. The mounting plate is thus adapted for releasably receiving a crash bar of the motorcycle. Formed along a vertical center line of the plate and adjacent to the bottom edge is a pivot bore. For reasons that will become apparent hereinafter, a plurality of circular recesses are formed in the front face of the plate above the pivot bore. It should be noted that the circular recesses are configured in a semicircular configuration. Next provided is a foot rest having an L-shaped configuration. A horizontal rod of the foot rest has an outer surface with gripping material situated thereon and a hemispherical outboard end. The foot rest further includes a vertical rod with a diameter less than that of the horizontal rod. A lower end of the vertical rod is integrally coupled in perpendicular relationship with an inboard end of the horizontal rod. An upper end of the vertical rod has an interconnection block mounted thereon. As shown in FIG. 4, the mounting block has a countersunk pivot aperture formed therein for receiving a pivot pin. Such pivot pin serves to be rotatably engaged with the pivot bore of the mounting plate. As such, the foot rest pivots about a horizontal axis. Finally, an adjustment assembly is provided including a conduit formed in the mounting block of the foot rest just above the pivot aperture. As shown in FIG. 4, the conduit has an outboard extent with a first diameter. An inboard extent of the conduit is equipped with a second diameter greater than the first diameter. Also included is an adjustment pin including a bulbous outboard end and an intermediate portion with the first diameter slidably situated within the conduit. The adjustment pin further has a cylinder with the second diameter mounted on an inboard end of the adjustment post. The adjustment assembly further includes a spring situated about the adjustment post and between the outboard extent of the conduit and the cylinder. In use, the spring is adapted for urging the cylinder into one of the circular recesses of the mounting plate. This allows selective fixing of the foot rest at a predetermined angle of rotation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable motorcycle foot rest apparatus and method which has many of the advantages of the motorcycle foot rests mentioned heretofore and many novel features that result in a new adjustable motorcycle foot rest which is not anticipated, rendered obvious, suggested, or even implied by any of the prior art motorcycle foot rests, either alone or in any combination thereof.

It is another object of the present invention to provide a new adjustable motorcycle foot rest which may be easily and efficiently manufactured and marketed.

It is a further object of the present invention to provide a new adjustable motorcycle foot rest which is of a durable and reliable construction.

An even further object of the present invention is to provide a new adjustable motorcycle foot rest which is susceptible of a low cost of manufacture with regard to both materials and labor, and which accordingly is then susceptible of low prices of sale to the consuming public, thereby making such adjustable motorcycle foot rest economically available to the buying public.

Still yet another object of the present invention is to provide a new adjustable motorcycle foot rest which provides in the apparatuses and methods of the prior art some of the advantages thereof, while simultaneously overcoming some of the disadvantages normally associated therewith.

Still another object of the present invention is to provide a new adjustable motorcycle foot rest for providing an adjustable foot rest that is removably coupleable to a crash bar of a motorcycle.

Even still another object of the present invention is to provide a new adjustable motorcycle foot rest that includes an L-shaped foot rest rotatably coupled to a motorcycle about a horizontal axis.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a detailed perspective view of the present invention.

FIG. 4 is a cross-sectional view of the present invention taken along line 4—4 shown in FIG. 3.

DESCRIPTION OF THE PREFERRED EMBODIMENT

Figure 1:
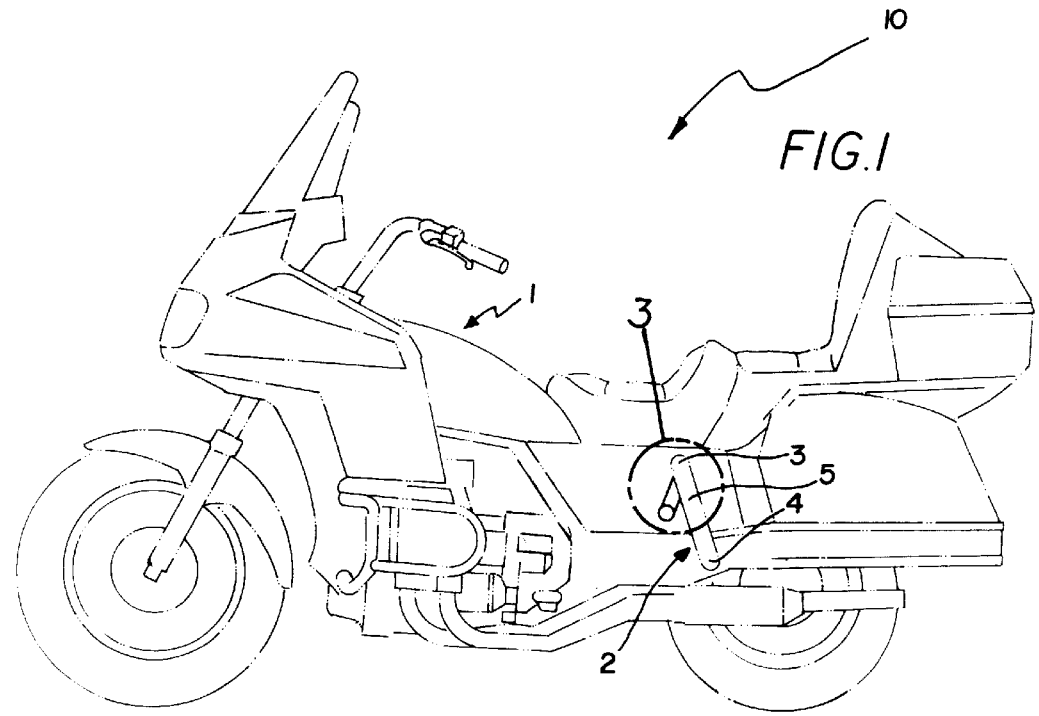
FIG. 1 is a side view of a new adjustable motorcycle foot rest according to the present invention.
Figure 2:
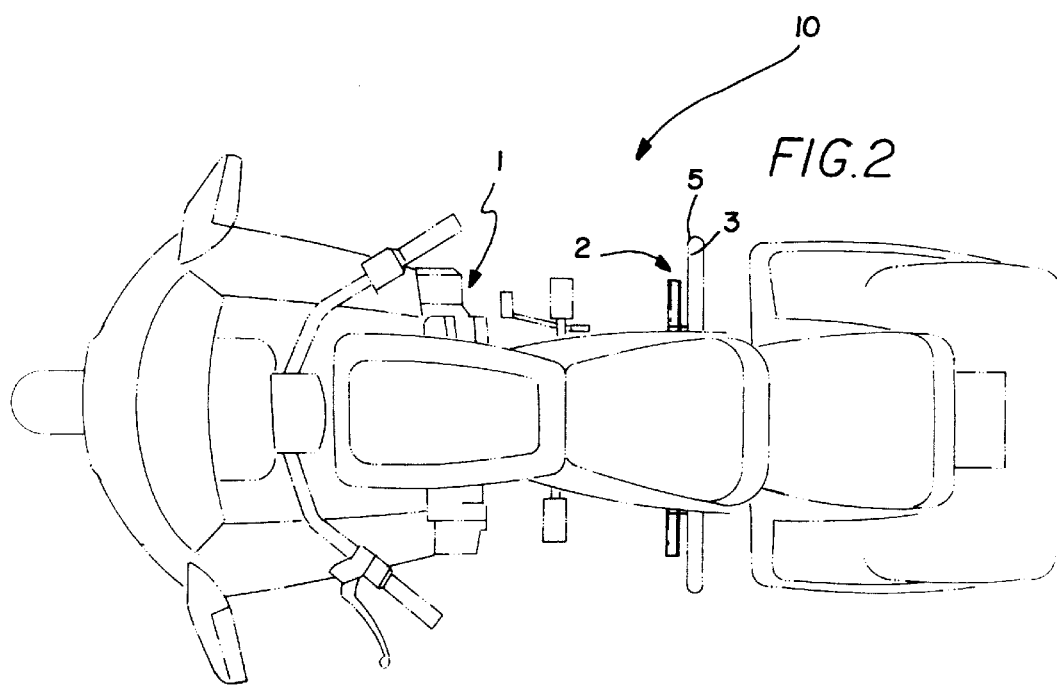
FIG. 2 is a top view of the present invention.

With reference now to the drawings, and in particular to FIGS. 1 through 4 thereof, a new adjustable motorcycle foot rest embodying the principles and concepts of the present invention and generally designated by the reference numeral 10 will be described.

The present invention, designated as numeral 10, includes a mounting plate 12 having a front face, a rear face and a periphery. Such periphery is defined by a semi-circular top edge and a rectangular bottom edge. As shown in FIG. 3, the mounting plate has a circular mounting bore 14 formed therein in concentric relationship with the top edge of the plate.

The mounting plate is thus adapted for releasably receiving a crash bar of the motorcycle and remaining fixed in relationship therewith. The a crash bar 2 of the motorcycle 1 comprises upper 3 and lower 4 substantially horizontally oriented bar portions with proximal ends mounted on the motorcycle and distal ends spaced from a chassis of the motorcycle. A substantially vertically oriented bar portion 5 connects the distal ends of the upper and lower horizontally oriented bar portions to form a substantially U-shaped bar. This may be accomplished by slidably positioning the mounting plate on the associated crash bar of the motorcycle. Further, a quick release O-ring clamp or the like may be situated about the crash bar for maintaining the mounting plate on the crash bar.

Formed along a vertical center line of the plate and adjacent to the bottom edge is a pivot bore 16. For reasons that will become apparent hereinafter, a plurality of circular recesses 18 are formed in the front face of the plate above the pivot bore. It should be noted that the circular recesses are configured in a semicircular configuration.

Next provided is a foot rest 20 having an L-shaped configuration. A horizontal rod 22 of the foot rest has an outer surface with gripping material situated thereon and a hemispherical outboard end. The foot rest further includes a vertical rod 24 with a diameter less than that of the horizontal rod. A lower end of the vertical rod is integrally coupled in perpendicular relationship with an inboard end of the horizontal rod.

An upper end of the vertical rod has an interconnection block 26 mounted thereon. As shown in FIG. 4, the mounting block has a countersunk pivot aperture 28 formed therein for receiving a pivot pin. Such pivot pin serves to be rotatably engaged with the pivot bore of the mounting plate. As such, the foot rest pivots about a horizontal axis. It should be noted that a pair of foot rests are provided one for each side of the motorcycle.

Finally, an adjustment assembly 30 is provided including a conduit 32 formed in the mounting block of the foot rest just above the pivot aperture. As shown in FIG. 4, the conduit has an outboard extent with a first diameter. An inboard extent of the conduit is equipped with a second diameter greater than the first diameter. The inboard extent further has a length which is at least twice that of the outboard extent. Also included is an adjustment pin 34 including a bulbous outboard end and an intermediate portion with the first diameter slidably situated within the conduit. The adjustment pin further has a cylinder with the second diameter mounted on an inboard end of the adjustment post.

The adjustment assembly further includes a spring 36 situated about the adjustment post and between the outboard extent of the conduit and the cylinder. In use, the spring is adapted for urging the cylinder into one of the circular recesses of the mounting plate. This allows selective fixing of the foot rest at a predetermined angle of rotation by simply momentarily pulling on the bulbous end of the adjustment pin. As such, a user may selectively rotate the horizontal rod of the foot rest upwardly and rearwardly when not in use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motorcycle foot rest system comprising:

a motorcycle having a crash bar comprising upper and lower substantially horizontally oriented bar portions with proximal ends mounted on the motorcycle and distal ends spaced from a chassis of the motorcycle, and a substantially vertically oriented bar portion connecting the distal ends of the upper and lower horizontally oriented bar portions to form a substantially U-shaped bar; and a foot rest comprising:

a mounting plate having a mounting bore receiving the upper substantially horizontally oriented bar portion of the crash bar of the motorcycle;

a foot rest member including a first elongate member and a second elongate member, the first elongate member having an upper end and a lower end, the second elongate member having an inner end connected to the lower end of the first elongate member such that the longitudinal axis of the second elongate member is oriented substantially perpendicular to the first elongate member;

wherein the upper end of the first elongate member is pivotally connected to the mounting plate for permitting pivoting of the first elongate member about a substantially horizontal axis and mounting the foot rest member to the crash bar such that the second elongate member is swingable about the substantially horizontal axis and through the U-shaped bar of the motorcycle crash bar; and a locking means for releasably locking the first elongate member at a plurality of pivot positions about the substantially horizontal pivot axis such that the second elongate member is lockable at a plurality of swing positions relative to the motorcycle crash bar.

2. A motorcycle foot rest system as set forth in claim 1 wherein the mounting plate has a pivot bore formed in the plate substantially below the mounting bore, and wherein a plurality of recesses are formed in the mounting plate in a semicircular configuration centered on the pivot bore, and additionally comprising a mounting block mounted on the upper end of the first elongate member, the mounting block having a pivot aperture, a pivot pin extending through the pivot aperture and the pivot bore such that the pivot pin pivotally connects the mounting block to the pivot bore of the mounting plate.

3. A motorcycle foot rest system as set forth in claim 1 wherein the locking means comprises an adjustment assembly including a conduit formed in the mounting block in a spaced relationship from the pivot aperture, an adjustment post received in the conduit, the adjustment post having a bulbous outboard end, an intermediate portion with the first diameter slidably situated within the conduit, and a cylinder with the second diameter mounted on an inboard end of the adjustment post, the adjustment assembly further including a spring situated about the adjustment post and between the outboard extent of the conduit and the cylinder for urging the cylinder into one of the circular recesses of the mounting plate, thereby allowing selective fixing of the foot rest at a predetermined angle of rotation.

4. A motorcycle foot rest system as set forth in claim 1 wherein the second elongate member of the foot rest has a gripping material situated thereon.

5. A motorcycle foot rest system as set forth in claim 1 wherein the mounting plate has a pivot bore formed in the plate substantially below the mounting bore, and wherein a plurality of recesses are formed in the mounting plate in a semicircular configuration centered on the pivot bore, and additionally comprising a mounting block mounted on the upper end of the first elongate member, the mounting block having a pivot aperture, a pivot pin extending through the pivot aperture and the pivot bore such that the pivot pin pivotally connects the mounting block to the pivot bore of the mounting plate;

wherein the locking means comprises an adjustment assembly including a conduit formed in the mounting block in a spaced relationship from the pivot aperture, an adjustment post received in the conduit, the adjustment post having a bulbous outboard end, an intermediate portion with the first diameter slidably situated within the conduit, and a cylinder with the second diameter mounted on an inboard end of the adjustment post, the adjustment assembly further including a spring situated about the adjustment post and between the outboard extent of the conduit and the cylinder for urging the cylinder into one of the circular recesses of the mounting plate, thereby allowing selective fixing of the foot rest at a predetermined angle of rotation; and wherein the second elongate member of the foot rest has a gripping material situated thereon.

6. A motorcycle foot rest for mounting to a motorcycle, the motorcycle having a crash bar comprising upper and lower substantially horizontally oriented bar portions with distal ends spaced from a chassis of the motorcycle, and a substantially vertically oriented bar portion connecting the distal ends of the upper and lower horizontally oriented bar portions to form a substantially U-shaped bar, the foot rest comprising:

a mounting plate having a mounting bore for receiving the upper substantially horizontally oriented bar portion of the crash bar of the motorcycle;

a foot rest member including a first elongate member and a second elongate member, the first elongate member having an upper end and a lower end, the second elongate member having an inner end connected to the lower end of the first elongate member such that the longitudinal axis of the second elongate member is oriented substantially perpendicular to the first elongate member;

wherein the upper end of the first elongate member is pivotally connected to the mounting plate for permitting pivoting of the first elongate member about a substantially horizontal axis and swinging the second elongate member about the substantially horizontal axis, and a locking means for releasably locking the first elongate member at a plurality of pivot positions about the substantially horizontal pivot axis such that the second elongate member is lockable at a plurality of swing positions relative to the mounting plate;

wherein the mounting plate has a pivot bore formed in the plate substantially below the mounting bore, and wherein a plurality of recesses are formed in the mounting plate in a semicircular configuration centered on the pivot bore, and additionally comprising a mounting block mounted on the upper end of the first elongate member, the mounting block having a pivot aperture, a pivot pin extending through the pivot aperture and the pivot bore such that the pivot pin pivotally connects the mounting block to the pivot bore of the mounting plate; and wherein the locking means comprises an adjustment assembly including a conduit formed in the mounting block in a spaced relationship from the pivot aperture, an adjustment post received in the conduit, the adjustment post having a bulbous outboard end, an intermediate portion with the first diameter slidably situated within the conduit, and a cylinder with the second diameter mounted on an inboard end of the adjustment post, the adjustment assembly further including a spring situated about the adjustment post and between the outboard extent of the conduit and the cylinder for urging the cylinder into one of the circular recesses of the mounting plate, thereby allowing selective fixing of the foot rest at a predetermined angle of rotation.

7. The motorcycle foot rest of claim 6 wherein the second elongate member has an outer surface covered with a gripping material.

8. The motorcycle foot rest of claim 6 wherein the second elongate member comprises a substantially cylindrical rod.

9. The motorcycle foot rest of claim 6 wherein the length of the first elongate member is substantially equal to the length of the second elongate member.

10. The motorcycle foot rest of claim 6 wherein the second elongate member has an outer surface covered with a gripping material, wherein the second elongate member comprises a substantially cylindrical rod, and wherein the length of the first elongate member is substantially equal to the length of the second elongate member.

* * * * *